April 14, 1942.  N. F. ADAMSON  2,279,700

CLUTCH

Filed April 26, 1941

Inventor:
Nicholas F. Adamson
by John W. Darley
Atty

Patented Apr. 14, 1942

2,279,700

UNITED STATES PATENT OFFICE 2,279,700

CLUTCH

Nicholas F. Adamson, Racine, Wis., assignor to Twin Disc Clutch Company, Racine, Wis., a corporation of Wisconsin Application April 26, 1941, Serial No. 390,576

4 Claims. (Cl. 192—69)

My invention relates to clutches and more particularly to that type in which the driving position of the device is established by a mechanical or positive actuation of the component elements in contrast to spring loading.

One object of my invention is to devise a clutch of the plate type which is mechanically engaged by operating mechanism and in which the parts are arranged to insure that the clutch will run free in the disengaged position.

A further object is to provide a clutch of the character indicated in which engagement is effected through the medium of relatively short, constant throw levers or arms which, in the case of a duplex clutch, are embodied in a dual lever that is conditioned to assume a positive neutral position by the shifting collar.

Additional objects are the securement in a compact clutch structure of an adequate mechanical advantage in the operating mechanism for obtaining the required clamping pressure, ease of adjustment as the plates wear, a positive release of the clutch levers or arms during disengagement, and a general strengthening of the clutch against the hazards of sudden reversals and stoppages.

These and further objects of my invention will be set forth in the following specification, reference being had to the accompanying drawing, and the novel means by which said objects are effectuated will be definitely pointed out in the claims.

Figure 1:
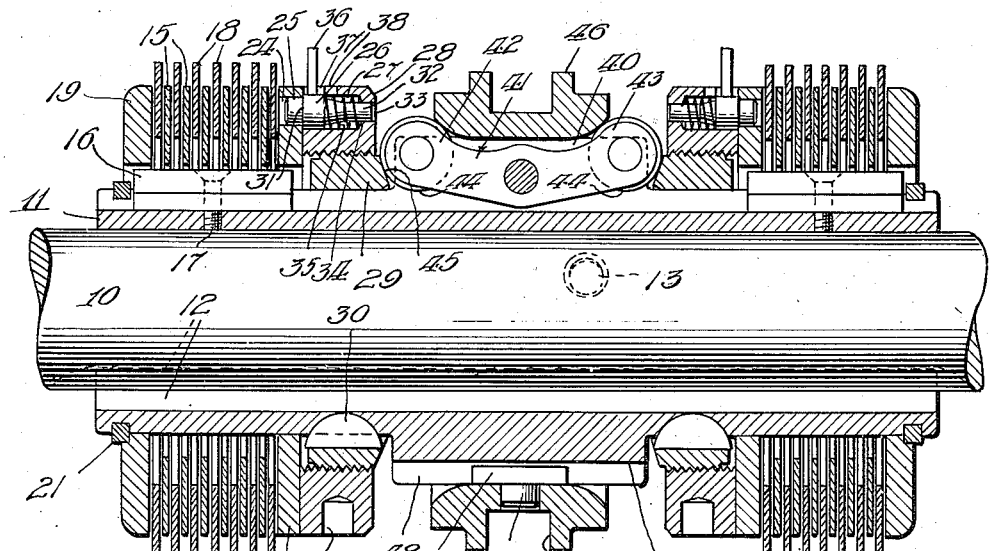
Fig. 1 is a sectional elevational of one form of my improved clutch construction showing a dual arrangement of clutches which may be used to effect changes in speed or a reversal in rotation of the driven member, both clutches being shown in the disengaged position.

The clutch illustrated in the drawing is similar to and is an improvement over that disclosed in United States Letters Patent No. 2,140,619 in respect of providing duplex operating levers which are arranged to assume a positive neutral position when both clutches are disengaged and of also providing a direct driving connection of certain parts of the clutch to the hub thereof in order to lessen the danger of breakage.

Referring to Fig. 1, the numeral 10 designates a shaft constituting one of the rotary parts and which, for purpose of illustration, will be denoted as the driven member of the clutch construction. A clutch hub 11 is secured to the shaft by means of a key 12 and set screw 13 and adjacent the ends of the hub are mounted the clutches which are identical in every respect. Accordingly, but one clutch will be described, reference hereinafter being made to the left hand clutch, as viewed in Fig. 1. The central portion of the hub i. e. that part between the clutches, is provided with an enlarged portion 14 for a purpose presently explained.

A plurality of friction, driven disks 15 is secured to the hub 11 by means of a plurality of keys 16, of which there may be any desired number circumferentially disposed in equispaced relation around the hub. The disks 15 are arranged for axial movement on the keys and endwise movement of each key is prevented by a machine screw 17 which passes through the key and is threaded in the hub 11. Alternately disposed with reference to the disks 15 is a plurality of friction, driving disks 18 whose periphery may be provided with a plurality of circumferentially disposed teeth (not shown) for driving engagement with a second rotary part which will be denoted as the driving member of the clutch, this part not being shown in the drawing. The peripheral teeth on each disk 18 are more particularly described in the aforesaid patent.

Figure 3:
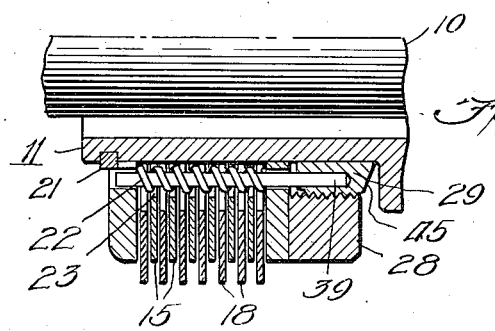
Fig. 3 is a fragmentary view of the left hand clutch, as viewed in Fig. 1, showing the relation of one of the releasing springs of the clutch to the friction plates.

The disks 18 are also arranged for axial movement and the two sets of disks 15 and 18 are forced into frictional, driving engagement by a pair of clamping members formed by a backing plate 19 and a pressure plate 20, the former contacting the left face of the collection of disks and the latter the right face, as viewed in Fig. 1, both of these plates being secured to the hub 11 by the keys 16. The backing plate 19 constitutes a fixed abutment against which the friction disks are clamped and endwise movement of this plate towards the left, as viewed in Fig. 1, is restrained by a split, spring ring 21 mounted in an annular recess in the hub and fitting in a recess provided in the plate. The plate 20 is actuated to clamp the friction disks by a mechanism hereinafter described and retracted to a released position by a plurality of springs 22 (see Fig. 3), of which there may be any desired number spaced around the hub and which operate within recesses 23 provided in the disks 15, the ends of the springs abutting at all times, whether in driving or released position against the opposed faces of the plates 19 and 20.

In addition to serving as a clamping member for the two groups of disks, the pressure plate 20 also functions to maintain the adjusting member of the clutch in any determined position. To this end, the plate 20 is provided with a plurality of circumferentially disposed holes 24 which are preferably equispaced around the annulus of the plate. These holes are intended to receive the reduced end 25 of a lock pin 26 which is carried and shiftable endwise in a cavity 27 provided in an adjusting ring 28 that is threaded on a floating ring 29 freely shiftable along the hub 11 and drivably connected thereto by means of one or more keys 30.

The intermediate portion of the pin 26 is enlarged to provide an annular flange 31, while the portion of the pin to the right of the flange is reduced as at 32 and slidable in a hole 33 that is aligned with but possesses a smaller diameter than the cavity 27 to thereby provide an internal shoulder 34. A coil spring 35 encircles the reduced portion 32, one end of the spring abutting against the shoulder 34 and the opposite end against the flange 31 to normally force the lock pin towards the left, as viewed in Fig. 1, relative to the adjusting ring 28. A finger grip pin 36 is mounted on the flange 31 and when the lock pin is occupying the position shown in Fig. 1, it extends outwardly of the adjusting ring through a slot 37 that is only slightly wider than the diameter of the finger pin. The left end of the slot terminates at the left face of the adjusting ring, while the opposite end communicates with an arcuate slot 38 that is transversely disposed with respect thereto and which also communicates with the cavity 27. In plan view, the slots 37 and 38 together form a T-shaped slot, the arrangement of the slot portions being such that when the lock pin is occupying the position shown in Fig. 1, the sides of the slot 37 contact the pin 36 to prevent any rocking movement thereof but, when the latter is retracted to a position wherein it is free from one of the holes 24 in the pressure plate 20, the locking pin may be rotated about its axis to place the finger pin 36 in one of the wings of the arcuate slot 38, thereby retaining the locking pin in retracted position and permitting an adjustment of the ring 28. In connection with the foregoing description, it should be noted that the clutch release springs 22 always exert pressure against the pressure plate 20, so that the latter is always maintained in contact with the adjusting ring 28. The locking pin construction, as described in this application, is substantially identical with that illustrated and claimed in United States Letters Patent No. 1,988,748.

A plurality of pins 39 is spaced around and mounted in the floating ring 29 in concentric relation to the hub 11 and each of these pins may be drivably fitted into a suitable pocket provided in the ring. These pins are equal in number to the springs 22 and each pin passes freely through apertures provided in the plates 19 and 20 and also through one of the release springs 22 in order to guide the action of these springs.

As a means of actuating the clutch parts to driving position, a plurality of radial slots 40 are cut inwardly of and preferably in equispaced relation around the enlarged hub portion 14. A dual clutch lever 41 is intermediately pivoted between the walls of each slot and each lever comprises oppositely extending arms 42 and 43, the free end of each arm being bifurcated to receive a roller 44. The lever 43 is symmetric on each side of its pivot so that it is capable of assuming a positive neutral position when both clutches are disengaged. Each roller is adapted to bear against an inclined end face 45 provided on the floating ring 29.

A shifting collar 46 is slidably mounted on the hub portion 14 in encircling relation to the levers 41 and this collar is drivably connected to the hub by a key 47 that is slidably mounted in a keyway 48, the key having a stub portion 49 that is received within a suitable aperture provided in the collar. This collar may be additionally provided with an annular channel 50 for the reception of the trunnions of the customary shifting fork (not shown).

In operation, it is contemplated that the driving disks 18 of the left hand clutch will be connected to a suitable driving member which will be characterized by one condition of operation as regards direction and speed of rotation, while the disks 18 of the right hand clutch will be driven by a second member which may be characterized either by a motion of rotation opposite to that applied to the disks 18 of the left hand clutch, or by a motion of rotation in the same direction, but at a different speed. Accordingly, with this dual type of clutch, the shaft 10 may be subjected to reversals of rotation as desired, or simply to changes in rotary speed dependent upon the character of the driving members which actuate the respective driving disks 18.

Figure 2:
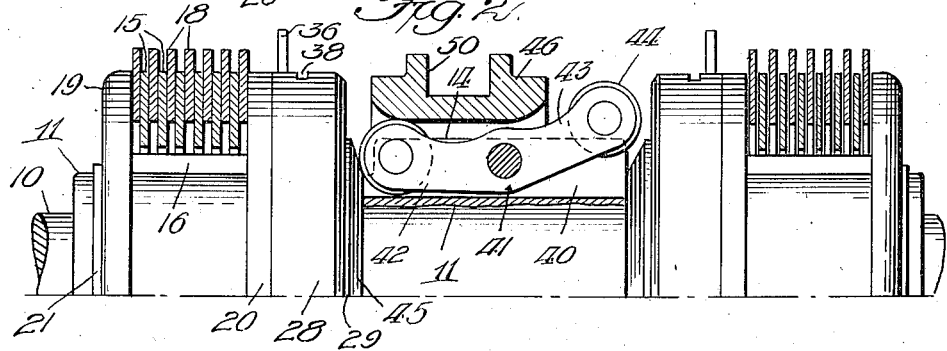
Fig. 2 is an elevation, partly in section, of the clutch shown in Fig. 1, showing one of the clutches engaged.

Assuming that the clutch construction effects reversals in the motion of rotation of the shaft 10, it will be obvious from an inspection of Fig. 2 that the left hand clutch is in driving engagement and that the right hand clutch is in released position due to the free action of the springs 22 and that, under these conditions, the lever 41 has been rocked in a counter-clockwise direction by the collar 46 to move the lever to the position shown in Fig. 2. To reverse the rotation of the shaft, the shifting collar 46 is moved toward the right, as viewed in Figs. 1 and 2 to thereby engage the rollers 44 on the arms 43 and depress these arms toward the axis of the shaft 10. This movement brings each of the indicated rollers into engagement with the inclined face 45 of the right hand floating ring 29 and thereby shifts this ring and the associated adjustment ring 28 and pressure plate 20 towards the right, thus clamping the group of friction disks against the fixed abutment provided by the right backing plate 19.

As the shifting collar 46 moves toward the right, the left hand rollers 44 are positively moved outwardly by the collar engaging the right hand rollers 44 so that as the right clutch is engaged, the left clutch is disengaged. The springs 22 assist in this disengaging action. When both clutches are disengaged, the dual lever is held by the collar 46 in the positive neutral position shown in Fig. 1.

As the friction disks 15 and 18 wear, it becomes necessary to readjust the initial position of the pressure plate 20 owing to the fixed range of movement of the lever arms 42 and 43. This adjustment is effected by means of the adjusting ring 28 which is rotated in the correct direction to axially move the pressure plate 20 by the insertion of a suitable tool in the hole 51, of which there may be provided a plurality extending inwardly from the periphery of the ring. Prior to such an adjustment, the locking pin 26 must be retracted from engagement with the pressure plate.

The pressure plate 20 functions as a base for the release springs 22 and also serves, owing to the extending pressure of these springs and the engagement between the pressure plate and the locking pin, to effectively lock the adjusting ring in any desired position. This adjustment is maintained regardless of the reversing or change speed movements of the clutch mechanism which might otherwise tend to shift the ring from its adjusted position due to inertia or momentum of the parts. In other words, the release springs 22 serve the dual purpose of separating and holding the backing and pressure plates apart, as well as maintaining through the pressure plate the adjusted position of the adjusting ring.

The foregoing clutch construction may be used in the dual arrangement as illustrated, or singly as desired, and, in either case, provides a very compact construction that does not sacrifice any of the mechanical advantages normally required in devices of this type. The relatively short clutch arms eliminate the disadvantages commonly associated with long springy arms that are often used with this type of construction, but without weakening the clutch in any particular.

In the duplex form, my improved clutch is particularly characterized by ruggedness and high capacity under conditions of sudden reversals and the same attributes exist in the case of a single clutch where frequent and rapid stoppages occur, as by the use of a braking mechanism. The direct keying of the floating ring 29 to the hub 11 is an important factor in the construction because it materially strengthens the clutch relative to the manner of drivably connecting the floating plate in the assembly as disclosed in the aforesaid Patent No. 2,140,619 wherein the floating plate is connected to the backing and pressure plates by pins comparable to the pins 39 and is not directly connected to the hub. In the last noted structure, the pins were occasionally sheared.

The duplex lever construction is also an important feature of my construction in that it readily assumes and holds a positive neutral position under the control of the shifting collar, while at the same time permitting a positive release of both clutches. Moreover, the incorporation of the two lever arms in a single lever provides a shortness of design which is particularly useful under certain operating conditions, such as in machine tools where there may be limitations as to available space.

I claim:

1. In a clutch, the combination of a rotary part, friction members attachable to the part and a separate rotary part, respectively, and adapted for driving engagement with each other, a backing plate and a clamping plate for effecting the engagement of the members, the backing plate acting as abutment against which the friction members are clamped, an adjusting ring for contacting the clamping plate, a floating ring acting as a carrier for the adjusting ring and keyed directly to the first named part, arms swingable inwardly for engagement with the floating ring to clamp the members in driving position, an element connected to each arm, and a collar shiftable in one direction to move the arms to clamp the members and in the opposite direction to engage the elements and positively move the arms to a released position.

2. In a clutch, the combination of a hub, friction members attachable to the hub and a separate rotary part, respectively, and adapted for driving engagement with each other, a backing plate and a clamping plate mounted on the hub, the backing plate acting as an abutment against which the friction members are clamped, an adjusting ring for contacting the clamping plate, a floating ring acting as a carrier for the adjusting ring and keyed directly to the hub, a plurality of arms spaced around the hub, each arm being pivoted on the hub and having an element for engaging the floating ring to clamp the members in driving position, and a second element extending in a substantially opposite direction from the first named element, and a collar shiftable in one direction to move the arms to clamp the members and in the opposite direction to engage the second elements and positively move the arms to a released position.

3. In dual clutch construction, the combination of a hub, a clutch mounted on each end of the hub, each clutch comprising two sets of friction members adapted for driving engagement with each other, one set being connected to the hub and the other set being attachable to a separate rotary part, a backing plate and a clamping plate mounted on the hub, the backing plate acting as an abutment against which the associated friction members are clamped, an adjusting ring contacting the clamping plate, a floating ring acting as a carrier for the adjusting ring and directly keyed to the hub, a plurality of dual levers spaced around the hub, each lever being intermediately pivoted on the hub and having a pair of oppositely extending arms for engaging the adjacent floating rings, respectively, to clamp the associated members in driving position, and a shiftable collar for selectively actuating either group of arms, the lever arms being so related to the collar that when both clutches are disengaged, the levers assume a positive neutral position under the control of the collar.

4. In a dual clutch construction, the combination of a hub, a clutch mounted on each end of the hub, each clutch comprising two sets of friction members adapted for driving engagement with each other, one set being connected to the hub and the other being attachable to a separate rotary part, a backing plate and a clamping plate mounted on the hub, the backing plate acting as an abutment against which the associated friction members are clamped, an adjusting ring contacting the clamping plate, a floating ring acting as a carrier for the adjusting ring and directly keyed to the hub, and a plurality of levers spaced around the hub, each lever being intermediately pivoted on the hub and having oppositely extending and connected arms for engaging the respective floating rings to clamp the associated members in driving position, and a collar shiftable in either direction to positively engage one group of arms with the associated members and positively disengage the other group.

NICHOLAS F. ADAMSON.